US006785425B1

(12) United States Patent
Feder et al.

(10) Patent No.: US 6,785,425 B1
(45) Date of Patent: Aug. 31, 2004

(54) METHOD AND SYSTEM FOR COMPRESSION OF IMAGES

(75) Inventors: Meir Feder, Herzliya (IL); Raz Barequet, Tel Aviv (IL); Stanley Barkan, Hof Hacarmel (IL)

(73) Assignees: Ramot At Tel-Aviv University Ltd., Tel Aviv (IL); Creo Il. Ltd., Herzila (IL)

( * ) Notice: Subject to any disclaimer, the term of this patent is extended or adjusted under 35 U.S.C. 154(b) by 0 days.

(21) Appl. No.: 09/534,751

(22) Filed: Mar. 24, 2000

(30) Foreign Application Priority Data

Mar. 28, 1999 (IL) ................................................ 129203

(51) Int. Cl.[7] .............................................. G06K 9/36
(52) U.S. Cl. ...................................... 382/247; 382/166
(58) Field of Search ...................... 358/426.01, 426.13; 341/65; 382/166, 238, 244–247

(56) References Cited

U.S. PATENT DOCUMENTS

| 5,680,129 A | | 10/1997 | Weinberger et al. ........... 341/65 |
| 5,764,374 A | * | 6/1998 | Seroussi et al. ............. 382/238 |
| 5,835,034 A | | 11/1998 | Seroussi et al. .............. 341/65 |
| 5,903,676 A | * | 5/1999 | Wu et al. .................... 382/244 |
| 5,956,467 A | * | 9/1999 | Rabbani et al. ............. 382/166 |

OTHER PUBLICATIONS

J.A. Robinson, "Efficient General–Purpose Image Compression with Binary Tree Predictive Coding", IEEE Transactions on Image Processing, vol. 6, No. 4, pp. 601–608, Apr. 1997.
X. Wu, N. Memon and K. Sayood, "A Context–Based, Adaptive, Lossless/Nearly–Lossless Coding Scheme for Continuous–tone Images", Proposal for the initial ISO/JPEG evaluation, http://www.csd.uwo.ca/faculty/wu/iso.ps, Jul. 1995.
X. Wu et al, "An Algorithmic Study on Lossless Image Compression", in Proceedings of the 1996 Data Compression Conference (Snowbird, Utah, USA), pp. 150–159, Mar. 1996.
P.G. Howard and J.S. Vitter, "Fast and Efficient Lossless Image Compression", in Proceedings of the 1993 IEEE Data Compression Conference (Snowbird, Utah, USA), pp. 351–360, Mar. 1993.
M.J. Weinberger, G. Seroussi and G. Sapiro, "LOCO–I: A Low Complexity, Context–Based, Lossless Image Compression Algorithm", in Proceedings of the 1996 IEEE Data Compression Conference (Snowbird, Utah, USA), pp. 140–149, Mar. 1996.
A. Said and W.A. Pearlman, "A New, Fast, and Efficient Image Codec Based on Set Partitioning in Hierarchical Trees", IEEE transactions on Circuits and Systems for Video Technology, vol. 6, Jun. 1996.

(List continued on next page.)

*Primary Examiner*—Amelia M. Au
*Assistant Examiner*—Colin LaRose
(74) *Attorney, Agent, or Firm*—Fitch, Even, Tabin & Flannery (57) ABSTRACT

A Simple Inter Color Lossless Image Coder (SICLIC) for the compression of colored images is provided. The color image is treated as several interlaced gray level images that correspond to respective distinct color planes. The compression scenario utilizes three main steps, such as selection of the predictor, context forming with bias cancellation and coding. SICLIC implements predictors, context forming and encoder techniques that exploit the intra- and inter-color plane correlations in an effective and relatively computationally inexpensive manner. The predictor is selected on the basis of the right selection of the contribution of each color plane between the intra- and inter-plane predictors obtained as a weight average of contribution from different color planes. SICLIC processes the image in two modes—regular mode and run mode. A special care is taken to ensure a proper treatment of joint runs, which occur simultaneously in all color planes.

31 Claims, 4 Drawing Sheets

OTHER PUBLICATIONS

X. Wu, W.K. Choi and N. Memon, "Lossless Interframe Image Compression via Context Modeling", in Proceedings of the 1998 Data Compression Conference (Snowbird, Utah, USA), pp. 378–387, Mar. 1998.

J.J. Rissanen, "Generalized Kraft Inequality and Arithmetic Coding," IBM Journal on Research Developments, vol. 20, No. 3, pp. 198–203, May 1976.

G.G. Langdon, Jr., "An Introduction to Arithmetic Coding," IBM Journal on Recent Developments, vol. 28, No. 2, pp. 135–149, 1984.

D.A. Huffman, "A Method for the Construction of Minimum–Redundancy Codes", in Proceedings of IRE, vol. 40, pp. 1098–1101, 1952.

ISO/IEC JTC1/SC29 WG1 (JPEG/JBIG), "Information Technology—Lossless and Near–Lossless Compression of Continuous–Tone Still Images", Draft International Standard DIS14495–1 (JPEG–LS), 1998.

W.B. Pennebaker, J.L. Mitchell, G.G. Langdon, Jr. and R.B. Arps, "An Overview of the Basic Principles of the Q–coder Adaptive Binary Arithmetic Coder", IBM Journal on Research Developments, vol. 32, No. 6, pp. 717–726, 1988.

S.V. Assche, W. Philips and I. Lemahieu, "Lossless Compression of Pre–Press Images Using a Novel Colour Decorrelation Technique", in Proc. of the 9th International Conference on Image Analysis and Procession, vol. II, Alberto Del Bimbo, Ed., Sep. 1997, vol. 1311 of Lecture Notes in Computer Science, pp. 85–92, Florence, Italy.

C.E.I. (Comité Européen d'Imprimerie) and tabled in Hunt, R.W.G., "The Reproduction of Colour in Photography, Printing & Television", 4th Edition, Fountain Press, England, 1987, p. 575.

* cited by examiner

METHOD AND SYSTEM FOR COMPRESSION OF IMAGES

FIELD OF THE INVENTION

The present invention relates to lossless or near lossless image compression.

BACKGROUND OF THE INVENTION

Many techniques, like pre-press imaging and medical imaging, demand very high quality. The images are often very large, say 2048×2048×3 pixels (e.g. in RGB format), thus requiring huge storage spaces and long transfer times. In order to alleviate these problems while keeping up with the "no loss" constraint, lossless compression techniques should be employed. While the compression ratio is rather small (of the order of 2–4), the benefits are quite worth the effort.

Theoretically, the minimal code length may be achieved by first transforming the color planes into three independent planes, decorrelating the planes in order to make them independent, and then compressing each plane optimally. That is why, most of the leading image compression techniques treat the color image (e.g. RGB) by this way, i.e. as three non-related gray-scale images. These include compression algorithms, such as:

BPTC [J. A. Robinson, "Efficient General-Purpose Image Compression with Binary Tree Predictive Coding", IEEE transactions on Image Processing, vol. 6, no. 4, pp. 601–608, April 1997], CALIC [X. Wu, N. Memon and K. Sayood, "A Context-Based, Adaptive, Lossless/Nearly-Lossless Coding Scheme for Continuous-Tone Images", Proposal for the initial ISO/JPEG evaluation, http://www.csd.uwo.ca/faculty/wu/iso.ps, July 1995; and X. Wu et al, "An Algorithmic Study on Lossless Image Compression", in Proceedings of the 1996 Data Compression Conference (Snowbird, Utah, USA), pp. 150–159, March 1996], FELICS [P. G. Howard and J. S. Vitter, "Fast and Efficient Lossless Image Compression", in Proceedings of the 1993 IEEE Data Compression Conference (Snowbird, Utah, USA), pp. 351–360, March 1993], LOCO-I [M. J. Weinberger, G. Seroussi and G. Sapiro, "LOCO-I: A Low Complexity, Context-Based, Lossless Image Compression Algorithm", in Proceedings of the 1996 IEEE Data Compression Conference (Snowbird, Utah, USA), pp. 140–149, March 1996], and SPIHT [A. Said and W. A. Pearlman, "A New Fast and Efficient Image Codec Based on Set Partitioning in Hierarchical Trees", IEEE transactions on Circuits and Systems for Video Technology, vol. 6, June 1996].

This approach, however, has not given promising results in practice. Due to its high complexity, these techniques requires high computational power.

Clearly, one can gain benefits in image compressing from exploiting the possible inter-color planes correlation. Therefore, another approach for treating the color image was employed. The main idea of this approach is to encode the current plane by using previous pixels from the same plane and from the other, already encoded, planes. The general concept is follows: first to encode one plane, and then to encode another plane by using the fact that the first plane is known already to the decoder, and finally, to encode the third plane by using the fact that both (first and second) planes are known to the decoder. This approach is implemented in Inter-Band CALIC algorithm, where the first, second and third color planes where the R, G and B planes, respectively (see X.

Wu, W. K. Choi, and N. Memon, "Lossless Interframe Image Compression via Context Modeling", in Proceedings of the 1998 Data Compression Conference (Snowbird, Utah, USA), pp. 378–387, March 1998). The approach of CALIC offers superior results, however, the method based on the algorithm of CALIC requires very high computational power.

Figure 1:
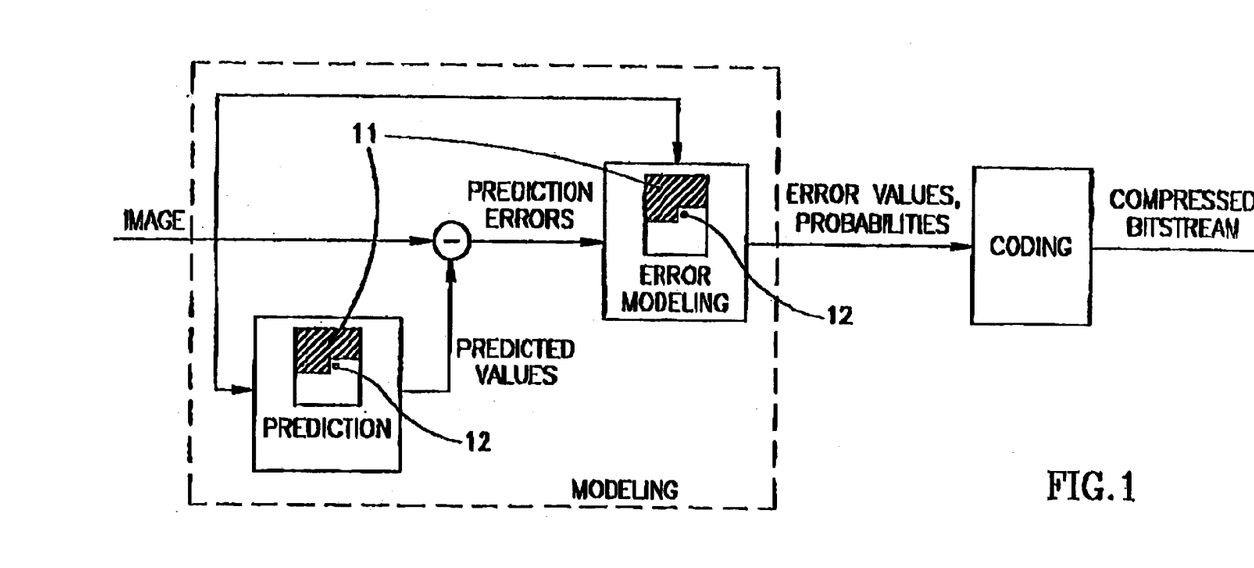
FIG. 1 is a generalized block diagram of a lossless image compression scheme.

Lossless image compression schemes often consist of two distinct and independent components: modeling and coding. This scheme of the lossless image compression is reflected in the block diagram of FIG. 1. The dashed areas 11 in the image icons represent the scanned past data, on which the probability assignment is based, while the black dots 12 represent the pixel currently coded.

The modeling part can be formulated as an inductive inference problem, in which an image is observed pixel by pixel in some pre-defined order (i.e. raster scan). Hence, observing a color image is a simple generalization of a gray-scale image scan, where the pixels of different color planes are interlaced. The term pixel here denotes a monochrome picture element, whereas the term color-pixel denotes a color picture element (consisting of three pixels).

The first step of the modeling is a prediction step in which by knowing the past data $X^1=X_1, X_2, \ldots, X_i$, the next pixel's conditional distribution $p(X_{i+1}|X^i)$ is estimated in order to predict a deterministic value for the next pixel $X_{i+1}$. Ideally, the code length contributed by $X_{i+1}$ is $-\log_2 [p(X_{i+1}|X^1)]$ bits, which averages to the entropy of the probabilistic model. On the next step of the modeling, one performs a determination of the context on which $X_{i+1}$ occurs. Indeed, a prediction of the next pixel using a small neighborhood is better performed when conditioned by contexts. If the image is not truly a stationary process, one expects it to be a mixture of different types of processes, which may be classified according to image texture and local smoothness. This is also treated by contexts, which condition the probabilistic behavior of the image. On the last step of the modeling a probabilistic model the prediction residual (the error value), conditioned on the context of $X_{i+1}$, is generated. The prediction residual (error) is obtained from subtraction of the predicted value from the actual value. The errors and probability distribution of the prediction error values are then coded to produce an output.

The coding part of the lossless image compression schemes of the modeled prediction residuals may be done by an arithmetic encoder [see J. Rissanen, "Generalized Kraft Inequality and Arithmetic Coding," IBM Journal on Recent Developments, vol. 20, no. 3, pp. 198–203, May 1976; and G. G. Langdon, Jr., "An Introduction to Arithmetic Coding," IBM Journal on Recent Developments, vol. 28, pp. 135–149, 1984], but this means a high complexity algorithm. Huffman coding of the prediction error [see D. A. Huffman, "A Method for the Construction of Minimum Redundancy Codes", in Proceedings of IRE, vol. 40, pp. 1098–1101, 1952] is much simpler, but it results in lower performance.

A method based on the aforementioned concept of modeling, which overcomes many problems of coding was implemented in U.S. Pat. No. 5,680,129 and in U.S. Pat. No. 5,835,034 by Weinberger, Seroussi and Sapiro. They invented the LOCO-I algorithm forming the basis for the draft standard JPEG-LS of ISO, ISO/ITU ISO/IEC JTC1/SC29 WG1(JPEG/JBIG) for lossless and near-lossless compression of continuous-tone images, Draft International Standard DIS14495-1 (JPEG-LS), 1998. LOCO-I combines the simplicity of Huffman coding with the compression potential of context models. A small number of free statistical parameters is used in LOCO-I to approach the capability of much more complex universal context modeling techniques without the drawbacks of context-dilution. Such a context dilution can occur due to the exponential growth of the number of states with respect to the model's order. Avoiding the dilution is achieved by using a small efficient context space along with the adaptive, symbol-wise, Golomb-Rice code, depending on a single-parameter probability distribution. Another useful feature of LOCO-I is the embedded alphabet extension (run-mode), which further reduces the code redundancy when encoding runs.

However, despite a big step forward in the compressing technique there is still a need in the art to provide an improved method for lossless image compression, especially for color images. Indeed, the most advanced technques such as aforementioned U.S. Pat. Nos. 5,680,129 and 5,835,034 deal mostly with intra-plane approach. Despite the authors of LOCO-I describe the possibility of both intra- and inter-plane correlation for component prediction, they offer only specific approach for inter-plane predictor, which is based on the arithmetic averaging given by Eq. (10) of U.S. Pat. Nos. 5,680,129 and 5,835,034.

These patents also do not consider using a more varied structure of contexts or adaptive strategies such as taking the best between several intra- and inter-plane predictors, and do not show how to use the benefits of the inter-plane correlation in context forming and coding. In addition, they do not address the problem of joint run length encoding images.

It would therefore be desirable to provide a novel compressor for colored images, which will combine the benefits of the prior-art methods while maintaining at least the same order of complexity.

SUMMARY OF THE INVENTION

According to the present invention, there is provided a Simple Inter Color Lossless Image Coder (hereinafter SICLIC) for the compression of colored images. The invention utilizes ideas from LOCO-I and includes three main blocks, such as selection of the predictor, context forming with bias cancellation and coding, but it implements predictors, context forming and encoder techniques that exploit the inter-component correlations in an effective and relatively computationally inexpensive manner.

According to one embodiment of the invention, the color image is treated as three interlaced gray level images. In contrast to LOCO, by this embodiment the predictor is selected on the basis on the right selection of the contribution of each color plane, as opposed to the degenerated approach of LOCO-I, wherein the simple arithmetic averaging of the contribution of color planes was employed. Moreover, according to the invention, herein proposed a use of more than one predictor and selecting on the fly the best one between the intra- and inter-plane predictors obtained as a weight average of contribution from different color planes.

By a way of one non-limiting example, the G plane can be treated first, as this yields a small improvement in compression. A prediction of pixels in the is R and B planes can be based on intra-color correlations as well as inter-color correlations. Thus, SICLIC combines both intra-color and inter-color prediction and coding. In contrast to the treatment of gray scale images, where the contexts are generated from the local previous pixels of the current pixel, color images require inter-color correlations, which capture the inter-color behavior of the images. As will be illustrated below, an example of inter-color correlation is based on construction of an inter-color neighborhood, which, in turn, is based on constructing differences between adjacent pixels in two gray level images.

Thus, in accordance with the invention, there is provided a method for obtaining substantially lossless compression of a color digitized image that is composed of three distinct gray level images, which correspond to respective distinct color planes; each of said gray level images includes pixels, the method comprising the steps of:

(a) compressing a first gray level image that corresponds to a first color plane, utilizing an intra-color prediction;

(b) for the second gray level image relative to said first gray level image, performing repeatedly:

(i) calculating a predicted value of a pixel on the basis of inter-color correlations between at least one adjacent pixel in the second gray level image and at least one adjacent element in the first gray level image;

(ii) comparing the predicted value and the real value of the element so as to produce residual value;

(iii) determining the context of said element;

(iv) quantizing said context;

(v) updating a quantized context related bias residue;

(vi) comparing the residual value and the bias residual value to produce a bias-free residual value; and (vii) coding a value that depends upon said bias-free residual value, (c) for the third gray level image, performing said steps b(i) to b(vii) relative to either or both of said first gray level image and second gray level image.

It should be noted that when referring to "both of said first gray level image and second gray level image," it may be construed as applying the specific steps to the third gray level image relative to the second gray level image and, further applying separately the specified steps to the third gray level image relative to the first gray level image. However, "both" my also refer to the situation, in which the specified steps apply to some kind of combination of said first and said second gray level images. One has to bear in mind, that the same interpretation also applies to a situation, when more than three color planes are used.

After compression, the image may be transmitted to remote sites (e.g. via the Internet) for decoding and decompression.

It should be noted, that according to the invention there is proposed an improved approach for context forming and coding, which utilizes both the intra- and inter-color plane correlations. It deals with both the intra-color contexts and inter-color contexts, thereby allowing the distinction between the intra- and inter-predictors and selection of the best of them.

As well as the aforementioned LOCO-I, SICLIC processes the image in two modes—regular mode and run mode. Having described above the general structure of the regular mode, including selection of the predictor, context forming with bias cancellation and coding, there is further proposed an improvement for the run mode. The run mode is an enhancement for reducing code redundancy, and is aimed at encoding groups of adjacent identical pixels. Runs may occur simultaneously on all the color planes, but they may also occur on one of the color planes. To this end, SICLIC's run mode deals with preferably (although not necessarily) both joint runs and disjoint runs. In order to obtain an efficient compressing special care is taken to ensure a proper treatment of joint runs, which occur simultaneously in all color planes.

In accordance with the invention, there is further provided a method of decompression of a color image composed of three distinct color planes using a decoder, the method comprising:

(i) retrieving the compressed color image; and (ii) decoding at least one color pixel from data of compressed image, comprising the steps of:
  (a) determining the context of at least one pixel by performing the steps that include:
    (1) providing intra-color and inter-color neighborhoods constructed on the basis of the intra-color and inter-color correlations, wherein the intra-color and inter-color neighborhoods are composed of intra-color pixels and inter-color elements; and
    (2) determining the context of said pixel and element based on values of at least one gradient between at least two pixels and at least one gradient between at least two elements in said neighborhoods;
  (iii) calculating predicted values of a pixel and element on the basis of inter-color correlation between at least two adjacent pixels and between at least two adjacent elements, wherein the adjacent pixel is at least one pixel of the intra-color correlation and the adjacent element is at least one element in the second gray level image and corresponding at least one adjacent element in the first gray level image;
  (iv) accessing a context-specific code table and retrieving residual values from the table in response to encoded data, said residual values corresponding to intra- and inter-plane contexts;
  (v) combining the residual values with the predicted values for at least one pixel and at least one element in order to obtain an actual value of said color pixel.

The present invention still further provides for a system for obtaining substantially lossless compression of a color digitized image that is composed of three distinct gray level images that correspond to respective distinct color planes; each of said gray level images includes pixels, the system comprising a processor of capable of performing the steps of:
  (a) compressing a first gray level image that corresponds to a first color plane, utilizing an intra-color prediction;
  (b) for the second gray level image relative to said first gray level image, performing repeatedly:
    (i) calculating a predicted value of a pixel on the basis of inter-color correlations between at least one adjacent pixel in the second gray level image and at least one adjacent element in the first gray level image;
    (ii) comparing the predicted value and the real value of the element so as to produce residual value;
    (iii) determining the context of said element;
    (iv) quantizing said context;
    (v) updating a quantized context related bias residue;
    (vi) comparing the residual value and the bias residual value to produce a bias-free residual value; and
    (vii) coding a value that depends upon said bias-free residual value;
  (c) for the third gray level image, performing said steps b(i) to b(vii) relative to either or both of said first gray level image and second gray level image.

BRIEF DESCRIPTION OF THE DRAWINGS

The presented invention will be more fully understood hereinafter from the following detailed description of preferred embodiments when taken in conjunction with the following drawings in which.

DETAILED DESCRIPTION OF PREFERRED EMBODIMENT

The present invention is a system for lossless compression of continuous-tone colored images. As well as aforementioned LOCO-I it processes the images in two modes—regular mode and run mode.

Figure 2:
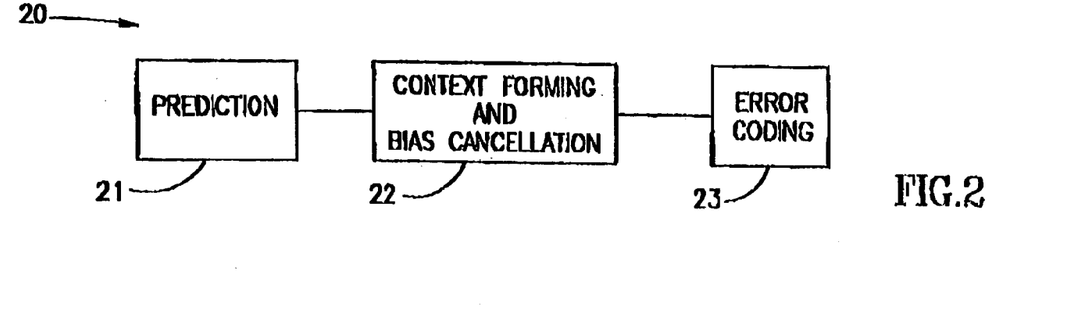
FIG. 2 is a generalized block diagram of a Simple Inter-Color Lossless Image Coder (SICLIC)

Turning at first to the regular mode of a SICLIC (see (20) in FIG. 2), it includes three main blocks,
(I) predictor, (21) which predicts the values for the G, R and B color planes.
(II) context forming and context related prediction bias cancellation (22), and
(III) context related final prediction error coding (23).

It should be noted that for clarity of explanation the description the inter-color compression of the invention refers to ROB color model. However, the invention is not confined to the RGB color model. Thus, for example, Four color planes or six color planes may be employed, all as required and appropriate.

By a way of one non limiting example, the G plane can be treated first, as this yields a small improvement in compression. Hence, having treated the G color plane, one has to deal with the pixels in the R plane and thereafter B plane. However, those having skill in the art to which the present invention pertains can expect that the order of treatment of the color planes can be modified.

Figure 3:
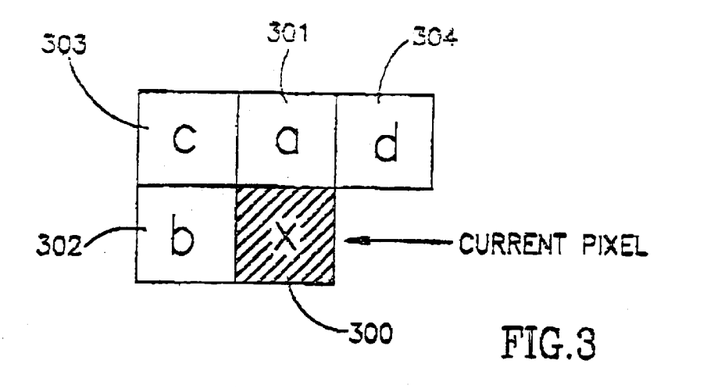
FIG. 3 is a graphic depiction of a causal template of the LOCO-I scheme.

In one non limiting example of an intra-color (non-linear) prediction (21), a prediction of pixels in the G color plane is identical to the LOCO-I prediction (see FIG. 3), to wit:

$$\hat{X} = \begin{cases} \min(a, b) & \text{if } c \geq \max(a, b) \\ \max(a, b) & \text{if } c \leq \min(a, b) \\ a + b - c & \text{otherwise} \end{cases} \quad (1)$$

where X denotes pixels in the G plane. Thus, in order to predict the value of pixel X, the values of adjacent pixels a, b and c (whose values are already known) are calculated in accordance with algorithmic Eq. (1), wherein the pixel above the current pixel 300 is denoted by a (pixel 301), the value of the "West" pixel is denoted by b (pixel 302), while the values of the "North-West" pixel and "North-East" pixels are denoted by c (pixel 303) and d (pixel 304), respectively.

Having calculated the values of pixels in the G color plane, there follows a prediction of pixels in the R plane and thereafter in the B plane.

Figure 4A:
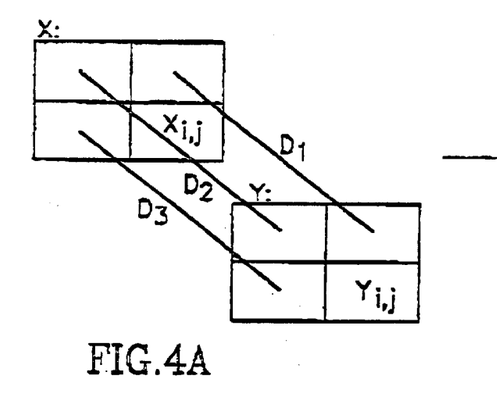
FIG. 4 is a graphic depiction of the inter-color correlations (a) and inter-color neighborhood (b) in accordance with one embodiment of the present invention.

This prediction is based on inter-color correlation between pixels in one plane (R) and corresponding adjacent pixels in another plane (G). For example, the prediction can rely on knowing the corresponding pixel in the G plane (FIG. 4a). Since $X_{ij}$ pixel in the G plane is known, predicting $Y_{ij}$ of plane R for instance, is equivalent to predicting the differences $D_{ij}=X_{ij}-Y_{ij}$. By this specific example, the mutual behavior (or inter color correlation) of the respective gray level images is manifested by calculating difference between adjacent pixels in the manner specified. In another application different behavior (or inter-color correlation) may be employed.

Figure 4B:
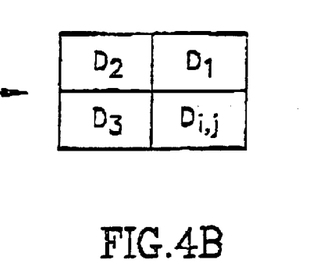

In order to predict $Y_{ij}$, $D_1$, $D_2$, and $D_3$ (constituting an inter-color neighborhood, based e.g. on calculating difference between pixels, where $D_1$, stands for inter color element) are calculated by using the respective pixels ($X_1$, $Y_1$), ($X_2$, $Y2$) and ($X_3$, $Y_3$) that are already known (FIG. 4b).

A prediction of the differences $D_{ij}=X_{ij}-Y_{ij}$ may be done in various combination of the pixels of G and R planes, i.e. D=G–R.

Note, that whilst in the description and in the claims the prediction refers to the prediction of the pixel value, those versed in the art will readily appreciate that these prediction encompasses the prediction of any equivalents, such as, for example, the difference between pixels $D_{ij}$.

Figure 5:
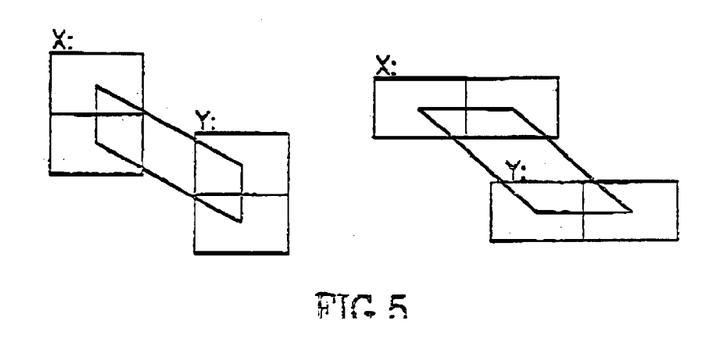
FIG. 5 is a graphic depiction of horizontal and vertical inter-color predictions according to one embodiment of the invention.

In one non limiting embodiment a prediction of the differences $D_{ij}$ may be done vertically or in another embodiment horizontally (FIG. 5) by using differences $D_1$, or $D_3$, respectively. Thus, the "vertical" prediction of $D_{ij}$ is based on $D_1$ in accordance with the following algorithmic expression:

$$\hat{Y}_{i,j}^v = D_{i-1,j} + X_{i,j} = Y_{i-1,j} + (X_{i,j} - X_{i-1,j}) \quad (2)$$

Note that $D_1$ stands for $D_{i-1,j}$ and $X_{ij}$ stands for the corresponding pixel in the G plane.

Likewise, the "horizontal" prediction of $D_{ij}$ is based on $D_3$ in accordance with the following algorithmic expression:

$$\hat{Y}_{i,j}^h = D_{i,j-1} + X_{i,j} = Y_{i,j-1} + (X_{i,j} - X_{i,j-1}) \quad (3)$$

Note that $D_3$ stands for $D_{i,j-1}$.

By way of still another non-limiting example, one can use a weighted combination of both vertical and horizontal directions, where the weight assigned to one direction is different than the weight assigned to the other direction. By this example, the inter-color neighborhood is composed of $D_1$ and $D_3$ elements, and the prediction is accomplished by calculating a linear combination of said elements and the value of the corresponding pixel $X_{i,j}$.

In accordance with another embodiment, simple and efficient way to predict $D_{i,j}$ can be done by utilizing the following algorithmic expression:

$$\hat{Y} = \begin{cases} \min(D_1, D_3) & \text{if } D_2 \geq \max(D_1, D_3) \\ \max(D_1, D_3) & \text{if } D_2 \leq \min(D_1, D_3) \\ D_1 + D_3 - D_2 & \text{otherwise} \end{cases} \quad (4)$$

Note, that by using Eq. (4), one achieves an inter-plane prediction, which combines both the horizontal and vertical directions.

The prediction of pixels in the R plane is generally based on knowing the correspondence pixels in the G plane. In a similar manner, prediction of pixels in the B plane is based on knowing the correspondence pixels in the R plane and/or on knowing the correspondence pixels in the G plane. The predictions obtained separately are then combined in order to give rise to predicted pixel in the B plane.

Figures 6A, 6B, 6C:
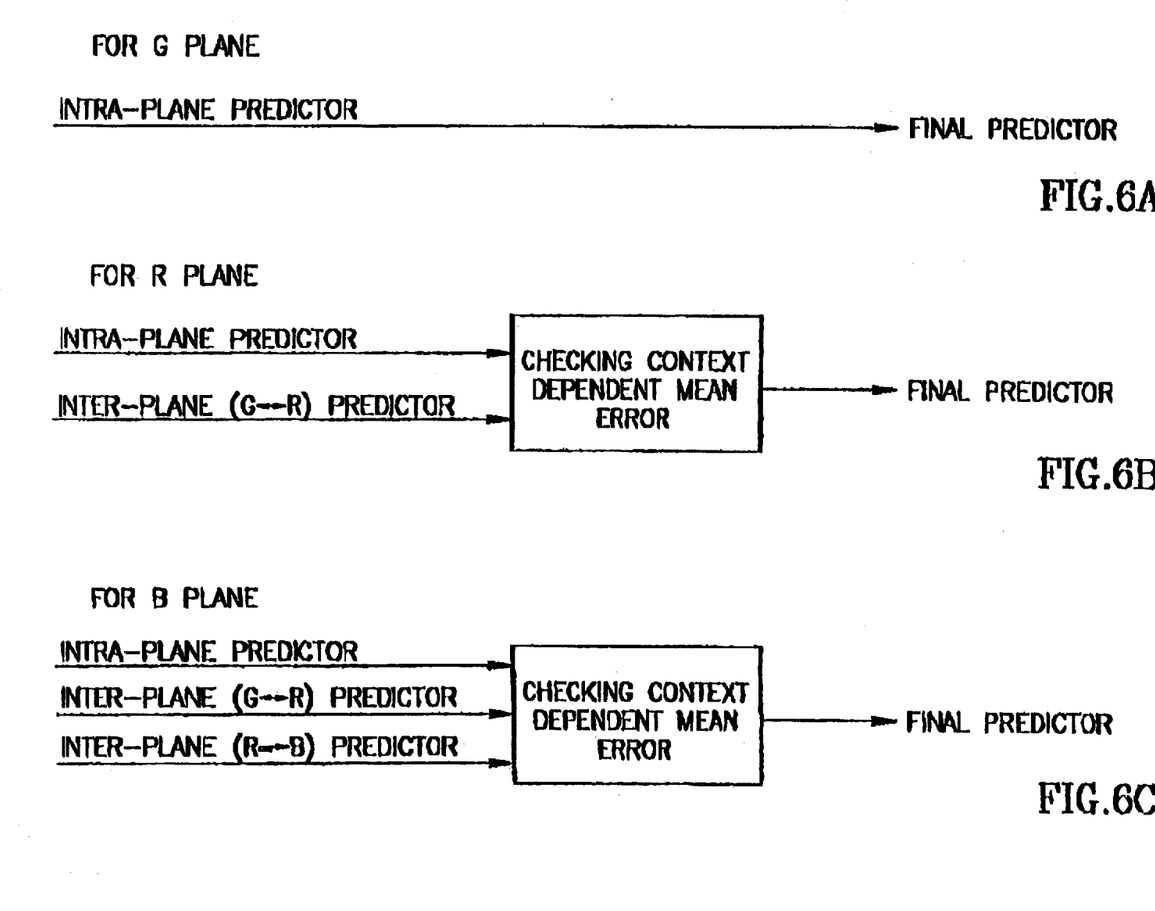
FIG. 6 is a tree depicting a scheme of the predictor selection for G (a), R (b) and B (c) color planes.

It has been found that for different color images, the most efficient compression result may be accomplished by using the best predictor from a set of different predictors. FIG. 6 illustrates an example of the scheme of the predictor selection. For example for Image A, one predictor would accomplish the most efficient compression result, whereas for Image B, another predictor would accomplish the most efficient result.

Accordingly, by another embodiment of the invention, at least two predictors are utilized and the final predictor having the best result is selected. Thus, at least two predictors are selected from a list of inter-color predictors, or if desired by using also intra-color predictor (such as that specified in LOCO).

Figure 7:
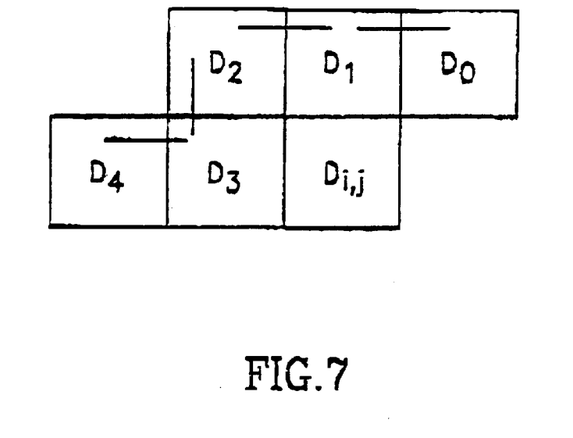
FIG. 7 is a graphic depiction of an inter-color neighborhood in accordance with one embodiment of the present invention.

The concept of constructing an inter-color neighborhood formed by the differences D=G–R, instead of treating a gray scale image (R plane) leads to a structure of inter-color contexts, which is similar to the contexts used by LOCO-I, however they are based on mutual behavior or inter-color correlation. Instead of defining the contexts according to gradient values between adjacent pixels as it was done in LOCO-I, according to the present invention, gradient values between elements are calculated. Such contexts proved to be quite successful, with regard to the compression ratios achieved. By way of one non limiting example of the invention, the context that are produced for the specific case where gradients being simple difference are: $\{D_0-D_1, D_1-D_2, D_2-D_3, D_3-D_4\}$ (FIG. 7).

Since the images are continuous, each pixel is represented by several bits (e.g. 8). Accordingly, each element of the image differences D is taken from a large alpha-bet (a number of different values). For example, if image pixels are represented by 8 bits, then (in the case of one element) it means $2^8=256$ different values (from 0 to 255). The elements of the image differences D can therefore take by values between –255 to 255, amounting to a total of 511 values. For n elements, $2 \cdot 511^n - 1$ contexts should be considered.

This leads to a very high model cost (the number of parameters necessary to model the image), since the number of possible contexts is quite big, and considering that they should all be stored in memory, the memory volume that should be allocated is practically infeasible. Moreover, as will be explained in more details below, the prediction of the prediction residual $\epsilon$, (error, $\epsilon=\hat{X}-X$) for a given context, improves as the specified context is encountered again and again. Due to the numerous number of possible contexts (i.e. $2 \cdot 511^n - 1$) the conditional probabilities can not be estimated reliably through occurrence counting in one image.

In order to reduce the model cost (i.e. reduce the number of contexts) the differences of the type $\{D_0-D_1, D_1-D_2, D_2-D_3, D_3-D_4\}$ are quantized into a small number of preferably, but not necessarily, equiprobable regions. Hence, this four differences generating the inter-color context have $2 \cdot 511^4 - 1$ values, after the quantizing, results in the final reduced context.

In accordance with one non-limiting approach for model cost reducing, the number of regions into which each gradient (difference) is quantized is determined by the low complexity requirements. The thresholds (i.e. the borders of the regions selected in the quantizing procedure) for context quantizing are calculated so that the conditional entropy of the prediction error $\epsilon$ $$H(\varepsilon|Context) = \sum_{C_1 \in contexts} P(C_1)H(\varepsilon|C_1),$$

is minimized, where the prediction error is $\epsilon=\hat{X}-X$. The shortcoming of the latter approach is that it requires heavy off-line computations.

In accordance with another non-limiting approach for model cost reducing, one may choose them sometimes intuitively, since it has been found that the compression ratio is not influenced much by these thresholds. By way of one non limiting example, these threshold are chosen as following: from −511 to −6 (standing for region −3); from −6 to −2 (standing for region −2); from −2 to 0 (standing for region −1), 0 (standing for region 0), from 0 to 2 (standing for region 1), from 2 to 6 (standing for region 2) and from 6 to 511 (standing for region 3). The probability of each region is approximately equal. This results in a quartet $\{q_1, q_2, q_3, q_4\}$, representing the context, which is formed by four differences (of elements in D) quantized according to the thresholds. For example, the differences (10, 7, −5, 1) are quantized to (3, 3, −2, 1). For example, if all the differences are quantized into 7 regions, then each $q_i$ (i=1, 2, 3, 4) may take on 7 possible values, and the whole quartet may be represented by a number between 0 and $7^4-1$.

In the case, when a single inter-color plane predictor and a single intra-color plane predictor are used, after quantizing, each corresponding context results in a quartet in the manner specified above. In one embodiment, it will result in the creating of one context space (octet $\{q_1, q_2, q_3, q_4, q_5, q_6, q_7, q_8\}$) by the Cartesian multiplication of both spaces. However, this embodiment is not efficient.

By another embodiment, more efficient the quartet context spaces $\{q_1, q_2, q_3, q_4\}_1$ and $\{q_1, q_2, q_3, q_4\}_2$ of the respective two predictors are treated in parallel, which allow for a simple parallel algorithm.

By way of one non limiting example, a context forming for plane G comprises forming, an intra-color context space by taking four differences of adjacent pixels (from plane G), and quantizing them. The quantizing thresholds can be chosen to be the same as in LOCO-I.

In the case of using one intra color predictor and one inter-color predictor, a context forming for plane R includes the construction of two parallel context spaces, one intra and another one inter. An intra-color context space is formed for example, by taking four differences of adjacent pixels from plane R $\{d-a, a-c, c-b, b-e\}$ (see FIG. 3), and quantizing them. The quantizing thresholds can be chosen, for example, to be the same as in LOCO-I. On the other hand, an inter color context space is formed by taking four differences of D as it was described above, where D=R−G, and quantizing them. The quantizing thresholds can be taken as in the aforementioned example (where 7 regions were employed). In the case, when several predictors are used, one has to construct the context space and quantizer it for all the predictors.

Having quantized planes G and R, there follows a description for quantizing for color plane B.

For convenience of explanation, three predictors are used for the B plane, one intra-color predictor for the B plain per se, one inter-color predictor for the correlation between B and R, and another inter-color predictor for the correlation between B and G. The invention is, of course, not bound by this specific embodiment.

An intra-color context space is formed, for example, by taking four differences of adjacent pixels from plane B, and quantizing them (the same way as for plane R per se or G per se). By this particular example, the quantizing thresholds are the same as in LOCO-I.

The first inter-color context space is formed by taking four differences s of adjacent elements of D, where D=R−B, and quantizing them exactly as described above for the R plane (D=R−G).

Similarly, the second inter color context space is formed by taking four differences of adjacent elements of D, where D=G−B, and quantizing them.

Having quantized the contexts for all three planes, a final reduction in the number of contexts can be obtained by merging of contexts of opposite signs using the symmetry of the conditioned prediction error probability $P_r(\epsilon_i=\Delta|C_1=\{q_1, q_2, q_3, q_4\}=P_r(\epsilon_1=-\Delta|C_1=\{-q_1, -q_2, -q_3, -q_4\}$, where $C_1$ and $\epsilon_1$ represent the context and the prediction error at the current pixel. This reduces the number of contexts by approximately half. The final reduction is disclosed in detail in LOCO.

It is known that any predictor may have a prediction residue bias. Preferably, and as it is disclosed in details in LOCO, the residue bias is calculated and eliminated. In its turn, the bias depends on the predictor nature and the data (particularly the context). A bias-free predictor is a predictor that ideally guarantees that the expectation of the prediction error is zero. The present invention deals with estimation of the bias residue and its elimination by the same way as it was done in LOCO.

Having eliminated the bias residue, the bias-free residue is fed as an input to coding. It should be understood that coding the bias-free residuals encompasses also the values, which are obtained after some further preferable but not necessary operations, for example, after undergoing further processing, such as merging.

Hence, for the residue bias is updated according to the context (quantized context) and is subtracted from the residue so as to give rise to bias-free residue.

In the case, when at least two predictors are employed, a decision criterion should be prescribed which predictor from a set of the predictors is the best predictor. The decision criterion is exemplified for the specific embodiment of employing one inter-color predictor and one intra-color predictor. Of course, the compression technique of the invention may employ at least one inter-color predictor and also at least one intra-color predictor.

Reverting now to the example of one inter-color predictor and one intra-color predictor. Since some images are better compressed using the intra-color correlations, while other are better compressed using the inter-color correlations, it has been found advantageous (although not obligatory) to use both types (and in each type possibly more than one instance) of predictors and their combinations.

According to one embodiment of the invention, the final decision which predictor to use is based on the context related average bias residue (absolute value) of both predictor types: intra-plane and inter-color planes predictors (FIG. 6). SICLIC compares the context based average of the bias residue magnitude (i.e. per quantized context), corresponding to both intra-color and inter-color predictors. The predictor with lower averaged bias residual is chosen on the fly, and the other is disregarded. If both predictors have similar averaged prediction residuals, the predictors may be combined in the manner described above. When considering hardware implementations, since both intra-color and inter-color context-based predictions are done in parallel, there is but a negligible added running time due to the decision which predictor to use.

In the case that more than two predictors are employed, the best predictor is determined by applying the specified criterion to the participating predictors. As will be explained below, there are cases where the best predictor is selected by combining two (or more) of said predictors.

Once a predictor is chosen, SICLIC calculates the prediction error $\epsilon=\hat{X}-X$. This error is reduced modulo $\alpha$, where $\alpha$ is the size of the pixels' alphabet (256 for an 8 bits per pixel image). This reduction is reversible, since given the predicted value $\hat{X}$, the prediction error must belong to the interval $[-\hat{X}, \alpha-\hat{X}-1]$. It is accepted in the prior art that the resulting error distribution is approximately govern by the Laplacian distribution function. Further, this two sided distribution is mapped into a one sided exponentially decaying. By a way of one non limiting example, a mapping function $M(\epsilon)$ is given by $$M(\varepsilon) = \begin{cases} 2\varepsilon \\ 2|\varepsilon|-1 \end{cases} \quad (5)$$

The mapping function interleaves negative and positive prediction residuals.

The last step in the compression technique is encoding the residue. In one non limiting embodiment it may be done by using an adaptive limited Golomb-Rice code [see ISO/IEC JTC1/SC29 WG1 (JPEG/JBIG), "Information Technology—Lossless and Near-Lossless Compression of Continuous-Tone Still Images, Draft International Standard DIS14495-1 (JPEG-LS)", 1998), which is nearly optimal to coding geometric distributions of non-negative integers. In accordance with the Golomb-Rice technique used in LOCO, the code is context dependent through one parameter, k, which is approximated through a formula k=$\log_2$ {E(|$\epsilon$|)], where E(|$\epsilon$|) is the expected prediction error magnitude. This estimation requires two variables per context, such as a number of prediction residuals observed N, and the accumulated sum of the magnitudes of those prediction residuals A calculated on the fly. By knowing these values, the expectation E(|$\epsilon$|) is estimated by the ratio A/N, and k is computed as k=min{k'|$2^{k'}$ N$\geq$A}. The code length required to encode the prediction error $\epsilon$ belonging to context k is given by k+1+($\epsilon/2^k$).

For example, if $\alpha$=256, then k may take values from 0 to 7, accounting for 8 different coding contexts. Note, that in this case, a compression is more efficient if one using an arithmetic coder instead of the Golomb-Rice coder. In such cases, optimally choosing the coding contexts yields less than 3% shorter image code lengths.

As it will be clear for a man of the art, this encoding technique needs a slight modification when at least two predictors are combined. For instance, this is the case when a pixel in the B color plane is predicted using pixels from both the R plane and the G plane. Thus for the case when two predictors are utilized in the Golomb-Rice coding scheme, one has two use $k_1$ and $k_2$ parameters associated with each predictor. The average of two correlated exponentially decaying sources is approximated by an exponentially decaying source, with an associated $k_{eff}$ parameter. By using the linearity of the expectation operator, it is clear to a man of the art that $k_{eff}$ is given by $$k_{eff} \approx \log_2\left[\frac{A_1}{2N_1} + \frac{A_2}{2N_2}\right]. \quad (6)$$

In a way of one example, when the averaging of predictions is done when both predictors have approximately the same averaged prediction error's magnitude, Eq. (6) is simplified and is given by $$k_{eff} \approx \frac{1}{2}(k_1 + k_2). \quad (7)$$

This simplification is preferable and easier for hardware implementation because it is having a negligible degradation (i.e. negligible losses in performance).

Note, that for enhancing the adaptation to the general non-stationarities of image statistics, i.e. when a color image has regions of high activity and regions of low activity (smooth regions), the variables A and N are halved whenever N attains some predefined threshold $N_0$ (between 64 to 256). This results in giving more weight to the immediate past (i.e. the pixels that are near the current pixels), than the remote past (i.e. the pixels remote from the current pixel).

According to another embodiment of the invention, encoding of the errors can be done by using an arithmetic coder [W. B. Pennebaker, J. L. Mithcell, G. G. Langdon and R. B. Arps, "An Overview of the Basic Principles of the Q-coder Adaptive Binary Arithmetic Coder", IBM Journal on Recent Developments, vol. 32, pp. 717–726, 1988].

It is known to men of the art that predictive coding is not optimal when one needs to encode groups of adjacent identical elements (pixels, inter-color differences, etc.). To overcome this problem in SICLIC, an alphabet extension is embedded in the model ("run" mode) likewise it was done in LOCO. However, in contrast to LOCO, where a "run" activates when a "flat region" context with a=b=c=d is detected in the intra-color plane, SICLIC also deals with inter-color flat region context.

According to one embodiment, the runs occur simultaneously at all color planes, according to another embodiment, the runs may also occur in one or two only. This is usually the case when one of the color planes is more noisy. SICLIC deals with this problem by supporting both types of runs—joint runs, and disjoint runs.

More specifically, the encoder marks each color plane as "run" when the condition a=b=c=d is met for that plane. The encoder keeps three pointers, one for each color plane, and checks for runs in all color planes. If the three pointers point to the same color-pixel and all the planes are marked as "run", the encoder enters a "joint-run" mode. In any other case, the planes marked as "run" are treated independently, and the encoder enters a "disjoint-run" mode. Whenever the pointers differ, the color plane corresponding to the lagging pointer is encoded, and the others are in a "wait" mode. This assures causality, since the lagging plane may be encoded either in a "run" mode or in a regular mode. The benefit of this synchronizing scheme is encoding joint runs as a single run, instead of three independent runs.

Once in a run mode, a run of a symbol b is expected, the run length is encoded. Note, that for color image it is a joint-ran of a triplet {$b_G$, $b_R$, $b_R$}. Note, that the run-length is the number of repetitions of the same symbol (pixel). Thus, for example, in the sequence 1111000001111111 there are three runs—a run of 0, with the run-length $l_{Run}$=4, a run of 1, with $l_{Run}$=5, and a run of 0, with $l_{Run}$=7.

When a run of length $l_{Run}$ occurs, the rank of $l_{Run}$ is encoded rather then the run-length itself. This idea is adopted from LOCO, wherein instead of coding the run-length, the idea was suggested to "break" $l_{Run}$ into several pieces, and code the number of pieces instead of $l_{Run}$ itself. For example, if $l_{Run}$=20, one can break it to 4 pieces of the length of 5, and code this number 4.

The ranking mechanism is implemented by a simple look-up table and a ranking pointer. It that means that in practice, there is a table of numbers, and a pointer which point to one of the values stored in the table. According to one embodiment of the present invention, SICLIC tries to point to the "average run length", so that when a run is encountered it will be "broken" to as minimal pieces as possible. The rank of the run is actually the number of pieces we need, according to the current value in said table.

For example, let us suppose the following numbers organized as a table: 1, 2, 4, 8, 8, 8, 16, 16, 16, 16, 16, 32, 32, 32, 32. A pointer can pick one of the possible 16 values.

Let us further suppose that a run-length of 35 is encountered, and suppose that the pointer is equal to 8. It means that it points to the number 16 in the table. According to the method the run-length is broken into pieces of length 16, that results in three pieces, 16, 16 and 3 (since the length was 35). According to the method, these pieces are encoded instead of the prior run-length. For instance, one non-limiting way of encoding can be done by assigning "1" to the all 16 pieces, and assigning "011" to the last piece. One has to bear in mind that the pointer to the table is updated on the fly.

When the run is broken by a non-matching symbol x (or a triplet $\{x_G, x_R, x_B\}$, the encoder goes into an "end-of run" state, where the difference $\epsilon = x-b$ (or $\{x_G-b_G, x_R-b_R, x_B-b_B\}$) is encoded. Runs are also broken by end-of-lines or by reaching a pre-specified maximum length. The decisions for entering run modes, maintaining the pointers and returning to a regular mode, are causal, and can therefore be reproduced identically by the decoder.

There follows non-limiting example of some compression results compared with that obtained by means of other techniques reported in the literature. The images used for the example are taken from several sources.

Thus the images are all color images, where every color-pixel is represented by 24 bits (8 bits per pixel). Most of the images are in the RGB color space, except for two (chart and faxballs), which are in the LAB color space. This set of images includes smooth images, compound documents, aerial photographs and computer generated images. The following tables show compression results in bits per pixel (=8/compression-ratio).

Table 1 shows a comparison of SICLIC and state of the art gray-scale image coders: LOCO-I, FELICS and CALIC.

TABLE 1

| 4.image | SICLIC | LOCO-I | FELICS | CALIC |
|---|---|---|---|---|
| Cats | 1.86 | 2.59 | 3.32 | 2.49 |
| Cmpnd1 | 1.12 | 1.30 | 2.39 | 1.21 |
| Cmpnd2 | 0.97 | 1.35 | 2.40 | 1.22 |
| Peppers | 3.25 | 3.88 | 5.14 | 4.62 |
| Water | 1.45 | 1.79 | 2.36 | 1.74 |
| (i)bike3 | 4.41 | 4.37 | 4.67 | 4.21 |
| Chart_s | 2.71 | 2.74 | 3.44 | 2.62 |
| Lena | 4.46 | 4.52 | 4.84 | 4.40 |
| Chart | 1.29 | 1.33 | 2.14 | 1.28 |
| Faxballs | 0.89 | 0.90 | 1.74 | 0.72 |

Table 2 further compares SICLIC with LOCO-I.

TABLE 2

| Image | air1 | air2 | barb | cwheel | fruits | girl | gold hill | Zelda | 06 | 20 |
|---|---|---|---|---|---|---|---|---|---|---|
| LOCO-I | 5.41 | 4.02 | 4.85 | 1.29 | 4.10 | 4.14 | 4.68 | 4.11 | 4.57 | 3.08 |
| SICLIC | 4.80 | 3.71 | 3.38 | 1.26 | 3.96 | 3.04 | 3.39 | 3.01 | 3.14 | 2.34 |

Table 3 shows a comparison of SICLIC, KLT+LJPG and Inter-Band CALIC. KLT+LJPG uses LJPG predictor and then decorrelates the color planes.

TABLE 3

| 5.image | SICLIC | KLT + LJPG | IB – CALIC |
|---|---|---|---|
| cats | 1.86 | 2.00 | 1.81 |
| chart_s | 2.71 | 3.57 | 2.58 |
| cmpnd1 | 1.12 | | 1.02 |
| cmpnd2 | 0.97 | 1.19 | 0.92 |
| water | 1.45 | 1.53 | 1.51 |
| lena | 4.46 | 4.54 | |
| peppers | 3.25 | 5.08 | |

LOCO-I results were obtained by running a downloaded executable, or extracted from

[M. J. Weinberger, G. Scroussi and G. Sapiro, "LOCO-I: A Low Complexity, Context-Based, Lossless Image Compression Algorithm", in Proc. of the 1996 Data Compression Conference (Snowbird, Utah, USA), pp. 140–149, March 1996] and

[X. Wu, W. K. Choi and N. Memon, "Lossless Interframe Image Compression via Context Modeling", in Proc. of the 1998 Data Compression Conference (Snowbird, Utah, USA), pp. 378–387, March 1998].

FELICS results were extracted from

[M. J. Weinberger, G. Seroussi and G. Sapiro, "LOCO-I: A Low Complexity, Context-Based, Lossless Image Compression Algorithm", in Proc. of the 1996 Data Compression Conference (Snowbird, Utah, USA)}, pp. 140–149, March 1996] and

[S. V. Assche, W. Philips and I. Lemahieu, "Lossless Compression of Pre-Press images using a Novel Color Decorrelation Technique", in Proc. of the 9th International Conference on Image Analysis and Processing, vol. II, Alberto Del Bimbo, Ed., September 1997, vol. 1311 of Lecture Notes in Computer Science, pp. 85–92, Florence, Italy].

CALIC results were extracted from

[M. J. Weinberger, G. Seroussi and G. Sapiro, "LOCO-I: A Low Complexity, Context-Based, Lossless Image Compression Algorithm", in Proc. of the 1996 Data Compression Conference (Snowbird, Utah, USA)}, pp. 140–149, March 1996],

[X. Wu, W. K. Choi and N. Memon, "Lossless Interframe Image Compression via Context Modeling", in Proc. of the 1998 Data Compression Conference (Snowbird, Utah, USA), pp. 378–387, March 1998] and

[S. V. Assche, W. Philips and I. Lemahieu, "Lossless Compression of Pre-Press images using a Novel Colour Decorrelation Technique", in Proc. of the 9th International Conference on Image Analysis and Processing, vol. II, Alberto Del Bimbo, Ed., September 1997, vol. 1311 of Lecture Notes in Computer Science, pp. 85–92, Florence, Italy].

KLT+LJPG results were extracted from

[S. V. Assche, W. Philips and I. Lemahieu, "Lossless Compression of Pre-Press Images using a Novel Colour Decorrelation Technique", in Proc. of the 9th International Conference on Image Analysis and Processing, vol. II, Alberto Del Bimbo, Ed., September 1997, vol. 1311 of Lecture Notes in Computer Science, pp. 85–92, Florence, Italy].

IB-CALIC results were extracted from
[X. Wu, W. K. Choi and N. Memon, "Lossless Interframe Image Compression via Context Modeling", in Proc. of the 1998 Data Compression Conference (Snowbird, Utah, USA), pp. 378–387, March 1998].

The results clearly show that SICLIC outperforms the gray-scale schemes. This is due to the inter-color dependencies, which are dominant in most images, compared to the spatial dependencies. When dealing with images that have dominant spatial dependencies, SICLIC does not attain better compression ratios, but the results are fairly equal to those of LOCO-I. Similar behavior is seen with CALIC and IB-CALIC, regarding the image titled charts (see Table 1). Further more. SICLIC's and LOCO-I's compression of the LAB images (the last two in table 1) are almost the same, since the color planes are nearly independent. In terms of average bit rates, SICLIC's compression is better than CALIC's by about 9%, and better than LOCO-I's by about 6%. Taking into account the size of the images, SICLIC's average code length is shorter than CALIC's by about 11.5% (see Table 1), and shorter than LOCO-I's by about 16% (see Tables 1 and 2).

The comparison with the two color schemes shows that SICLIC attains better compression ratios than the KLT+LJPG scheme, and is very close to the compression ratios achieved by IB-CALIC. SICLIC's compression gain, regarding the first five images, which is listed in Table 3, differs from IB-CALIC's by less than 3.5%. Taking into account the size of the images, SICLIC's average code length is longer than IB-CALIC's by less than 2%.

Further, the Golomb-Rice coder was replaced by a probabilistic (entropy) coder, which simulates an arithmetic coder, conditioned by 8 coding contexts corresponding to the Golomb-Rice k parameter. In this case, the average bit rate achieved without any additional optimization was equal to that of IB-CALIC. Optimal coding contexts, which are found and used by IB-CALIC, are not used in SICLIC, and may further contribute about 3% to compression (reduced code length). This suggests that SICLIC's contexts and context-based prediction is superior to that of IB-CALIC. Indeed, these results were obtained with a much lower level of complexity (about twice as much as in LOCO-I), and make easier the implementation in software and hardware (due to using fixed point only implementation).

While the present invention has been described in terms of several preferred embodiments characterized by the prediction step, the context forming, and the prediction error coding, it is expected that various modifications and improvements will occur to those skilled in the art upon consideration of this disclosure. Those having skill in the art to which the present invention pertains can perceive that the described above technique is most efficient for treatment of multi-component image data, which are non-linear transformations of the original light intensities captured by scanners and digital cameras. These transformations are performed by analog amplifiers within the capture device. Typically, the data recorded by this way are fractional power or logarithmic transformations of the incident light.

However, in modern, state-of-the-art digital cameras and scanners, for example, such as the Leaf Volare and the EverSmart Supreme scanner, available from Scitex Corporation, Herzlia, Israel, the CCD signals are converted to 14 or more bit data without non-linear analog amplification. Thus such digitized data are directly proportional to the number of electrons captured by the sensing device. In this case the intra- and inter-plane predictors defined by Eqs. (1)–(4) are not efficient. In one non limiting embodiment a prediction can be performed "vertically" and/or "horizontally", in accordance with the following algorithmic expressions:

$$\hat{Y}_{i,j}^v = (Y_{i-1,j})^t \cdot \left(\frac{X_{i,j}}{1+X_{i-1,j}}\right)^p \text{ and} \tag{8}$$

$$\hat{Y}_{i,j}^h = (Y_{i,j-1})^u \cdot \left(\frac{X_{i,j}}{1+X_{i,j-1}}\right)^s \tag{9}$$

where the exponents p, t, s, and u take the values from the set of real numbers. For example, p t, s, and u can be equal to unity (i.e., p=t=s=u=1). By way of another non-limiting example, one can use a weighted combination of both vertical and horizontal directions.

The latter embodiment illustrates a non-limiting example of utilizing non-linear combination prediction.

The present invention is not bound only to the RGB color model. For example, in the case of multi-component data print., the CMYK (cyan, magenta, yellow, black) color model and/or CMYKOG (cyan, magenta, yellow, black, orange, green) are used. The purpose of adding special inks is to increase the color gamut of the printed image in those hues where the primary CMY inks do not provide sufficient color range.

In these cases, according to one embodiment of the invention, the color image is treated as several parallel gray scale images. For example, for CMYK and CMYKOG models the color image will result in four and six color planes, respectively.

In one embodiment of the invention, the C, M and Y color planes can be treated by the same manner as it is described for the RGB images. A treatment of the O (orange) plane is based, as before, on the inter-plane correlation with the M and Y color planes (and possibly also intra-plane) while the treatment of the G plane is based on the inter-plane correlations with the C and Y color planes (and possibly also intra-plane).

In these cases the additional inks—black, orange and green—are often secondary values deterministically computable from the primary c, m and y values. If the mapping from (c, m, y) to black, orange or green is known at the time of compression, the secondary ink data may be compressed with zero entropy, apart from the overhead of encoding the formula. In cases where the exact formula is unknown, a good predictor may be constructed on the basis of known principles for the determination of additional ink values.

By way of one non-limiting example, the technique is illustrated below with respect to computation of the black component in CMYK, 8 bit images. The value of black, k, for a particular (c, m, y) triplet is usually a function of that ink, which has the minimum luminance on white paper, i.e.

$$k=f(\min\{L(c), L(m), L(y)\}) \tag{10}$$

where L (c), L (m), and L (y) arc the luminance magnitudes. In one embodiment of the invention, the magnitude of the luminance of the color x (wherein x=c, m, and y) is modeled linearly according to the relationship L (x)=$F_x$x, where the values for the factors $F_o$ $F_m$ and $F_y$ depend on the density of the inks being used. As an example, the factors $F_o$ $F_m$ and $F_y$ are typically approximated by the values, 0.43, 0.45, and 0.12 respectively. These values are adapted from standard CMY calorimetric measurements of printing inks, as standardized by C.E.I. (Comite Europeen d'Imprimerie) and tabled in Hunt, R.W.G., The Reproduction of Color in Photography, Printing and Television, $4^{th}$ edition, Fountain Press, England, 1987, p.575.

According to the invention, in order to compress the values of pixels of the black plane the following method is used:

Step 1. Initialize the 256 contexts for use in the black prediction. Each context contains a single predictor value k (context), an averaged prediction residual and a number of the prediction residuals, Then, for k component of each pixel (c, m, y, k) one has to perform the following:

Step 2. Computing the intra-plane predictor for k by using the intra-plane gradient context method.

Step 3. Computing the minimum integral value $CMY_{min}$ normalized to the largest value of $F_c$ c, $F_m$ m, and $F_y$ y. For the aforementioned typical example the value of $CMY_{min}$ is calculated as minimum of 0.96 c, m, and 0.27 y. This operation defines a black prediction context between 1 and 256.

Step 4. If a predictor value exists in the black prediction context $CMY_{min}$, use the predictor value, k (i.e. f($CMY_{min}$)), and update the averaged prediction residual and the number of the prediction residuals for every context.

Step 5. If no predictor value exists in the $CMY_{min}$ context, store the actual value of k as the predictor k (f($CMY_{min}$)) for this context.

Step 6. Select a predictor according to the better of the two context-based average prediction residuals and encode the associated residual.

Finally, after completing compression of all pixels, add a list consisting of the 256 predictor values contained in the 256 black prediction contexts into the compressed data stream for use by the decompression procedure.

Those having skill in the art to which the present invention pertains can now perceive that a similar scheme to that used for the K plane above may be developed to improve prediction of additional secondary colored ink channels such as orange or green. In this case the predicting components would be the adjacent hues, such as red and yellow for orange, and cyan and yellow for green.

Having described now image compression, in accordance with various embodiments of the invention, those versed in the art will readily appreciate, that if the image compressed is transmitted to remote site (i.e. a transmission to a client site via internet), it is required to apply decompression in order to reconstruct the image. The decompression, basically, involves applying the compression steps in reverse mutatis mutandis. Those versed in the art will readily appreciate, that the specific decompression technique, that is used, should match the corresponding compression technique. Accordingly, the decompression steps are not expounded herein in detail. A typical, yet not exclusive, decompression steps are illustrated with reference to FIG. 8

Figure 8:
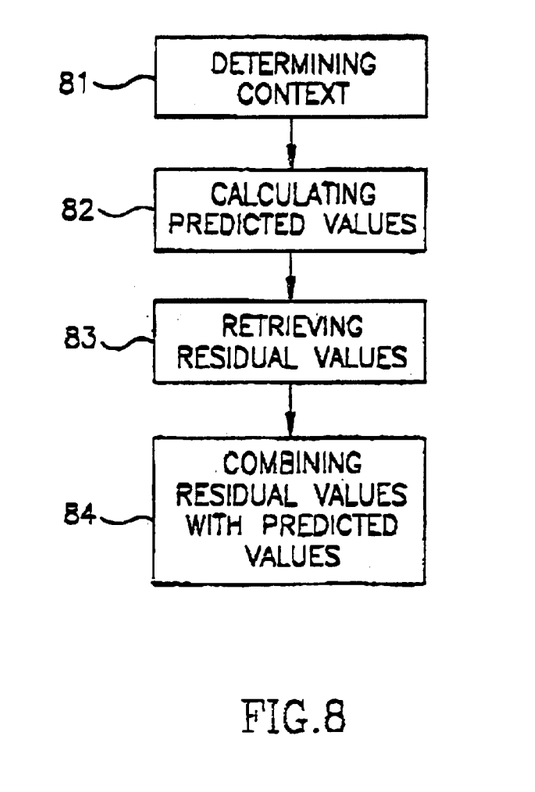
FIG. 8 illustrates a generalized block diagram of a lossless image decompression scheme.

(a) determining the context (81) of at least one pixel by performing the steps that include:
  (i) providing intra-color and inter-color neighborhoods constructed on the basis of the intra-color and inter-color correlations, wherein the intra-color and inter-color neighborhoods are composed of intra-color pixels and inter-color elements; and
  (ii) determining the context of said pixel and element based on values of at least one gradient between at least two pixels and at least one gradient between at least two elements in said neighborhoods;

(b) calculating predicted values (82) of a pixel and element on the basis of inter-color correlation between at least two adjacent pixels and between at least two adjacent elements, wherein the adjacent pixel is at least one pixel of the intra-color correlation and the adjacent element is at least one element in the second gray level image and corresponding at least one adjacent element in the first gray level image;

(c) accessing a context-specific code table and retrieving residual values (83) from the table in response to encoded data, and said residual values corresponding to intra- and inter-plane contexts;

(d) combining the residual values with the predicted values (84) for at least one pixel and at least one element in order to obtain an actual value of said color pixel.

By a way of one non-limiting example, said context-specific code table corresponds to a coder, which is selected from a group including Golomb-Rice code and arithmetic coder.

Those versed in the art will readily appreciate that alphabetic characters, numbers and roman symbols are used in the claims for convenience of explanation only, and, insofar as some of the steps are concerned, they do not imply any specific order. The term repeatedly does not imply that all the sequence of steps are necessarily performed serially.

The scope of the invention is not to be construed as limited by the illustrative embodiments set forth herein, but is to be determined in accordance with the appended claims.

What is claimed is:

1. A method for obtaining substantially lossless compression of a color digitized image that is composed of three distinct gray level images, which correspond to respective distinct color planes; each of said gray level images includes pixels, the method comprising the steps of:
  (a) compressing a first gray level image that corresponds to a first color plane, utilizing an intra-color prediction;
  (b) for the second gray level image relative to said first gray level image, performing repeatedly:
    (i) calculating a predicted value of a pixel on the basis of inter-color correlations between at least one adjacent pixel in the second gray level image and at least one adjacent element in the first gray level image;
    (ii) comparing the predicted value and the real value of the element so as to produce residual value;
    (iii) determining the context of said element, wherein said determining includes constructing parallel context spaces; providing an inter-color neighborhood composed of inter-color elements and constructed on the basis of the inter-color correlations stipulated in step b(i); and calculating the context of said element from values of gradients determined by calculating the difference between adjacent inter-color elements in said neighborhood;
    (iv) quantizing said context;
    (v) updating a quantized context related bias residue;
    (vi) comparing the residual value and the bias residual value to produce a bias-free residual value; and
    (vii) coding said bias-free residual value; and
  (c) for the third gray level image, performing said steps b(i) to b(vii) relative to either or both of said first gray level image and second gray level image,
  wherein the predicted value of a pixel in the second gray level image is determined in either vertical or horizontal directions, or both vertical and horizontal directions taken as a weighted function, in accordance with the following algorithmic expressions:

$$\hat{Y}_{i,j}{}' = D_{i-1,j} + X_{i,j} = Y_{i-1,j} + (X_{i,j} - X_{i-1,j}),$$

and $$\hat{Y}_{i,j}{}^h = D_{i,j-1} + X_{i,j} = Y_{i,j-1} + (X_{i,j} - X_{i,j-1}),$$

wherein said inter-color neighborhood stands for: $D_{i-1,j}$, $D_{i,j-1}$ and said $X_{i,j}$ stands for the corresponding pixel in said first gray level image.

2. The method of claim 1, wherein said prediction step on the basis of inter-color correlation stipulated in said step b(i) includes predicting the value of said element by calculating a non-linear combination of said inter-color elements and the value of the corresponding pixel in said first gray level image.

3. The method of claim 1, wherein the three distinct color planes are being Red, Green, and Blue (RGB).

4. The method of claim 3, wherein said first, second and third color planes correspond to said Green, Red and Blue colors, respectively.

5. The method of claim 1, wherein said first gray level image is compressed, as stipulated in step (a), by using the LOCO technique.

6. The method of claim 1, further comprising additional distinct gray level image, constituting fourth gray level image that corresponds to fourth distinct color plain; said method further comprising the step of:
(d) for the fourth gray level image, performing said steps b(i) to b(vii) relative to either one or more than said first gray level image, said second gray level image or said third gray level image.

7. The method of claim 1, further comprising additional at least two distinct gray level images, including fourth gray level image that corresponds to fourth distinct color plain, fifth gray level image that corresponds to fifth distinct color plain and fifth gray level image that corresponds to fifth distinct color plain; said method further comprising the step of:
(a) for the fourth gray level image, performing said steps b(i) to b(vii) relative to one or more of said first gray level image, second gray level image and third gray level image;
(b) for the fifth performing said steps b(i) to b(vii) relative to one or more of said first gray level image, second gray level image, third gray level image and fourth gray level image;
(c) for the sixth performing said steps b(i) to b(vii) relative to one or more of said first gray level image, second gray level image, third gray level image fourth gray level image, and fifth gray level image.

8. The method of claim 7, wherein the six distinct color planes being Cyan, Magenta, Yellow and Black, Orange and Green.

9. The method of claim 8, wherein said six gray level images correspond to the following color planes Cyan, Magenta, Yellow, Black, Orange and Green, respectively.

10. The method of claim 1, wherein said quantizing step includes: for each gradient determining to which within predetermined number of regions said gradient falls.

11. The method of claim 10, wherein said quantizing step includes, quantizing said gradients into substantially equiprobable regions.

12. The method of claim 1, wherein each element is constituted by any number of bits between 8 bits and 14 bits.

13. The method of claim 1 wherein a code obtained after the coding step for at least one of the gray levels is transmitted to at least one decoder.

14. The method of claim 1, wherein an additional at least one predicted value is calculated in said step b(i), using respective prediction selected from the group of intra-color prediction or inter color prediction having different inter-color correlation based prediction; the method further comprising the step of selecting the best prediction before applying the coding step.

15. The method of claim 14, wherein said intra-color prediction complies with the LOCO technique.

16. The method of claim 14, wherein said best prediction is determined in accordance with the minimal updated context related bias residue.

17. The method of claim 1, comprising applying run-length coding in accordance with either or both of joint-run and disjoint run modes.

18. The method of claim 1, wherein borders of the regions selected in the quantizing step are the following: from −511 to −6 (standing for region −3); from −6 to −2 (standing for region −2); from −2 to 0 (standing for region −1), 0 (standing for region 0), from 0 to 2 (standing for region 1), from 2 to 6 (standing for region 2) and from 6 to 511 (standing for region 3).

19. The method of claim 1, wherein said coding is selected from the group consisting of Golomb-Rice code and arithmetic coder.

20. A method for obtaining substantially lossless compression of a color digitized image that is composed of three distinct gray level images, which correspond to respective distinct color planes; each of said gray level images includes pixels, the method comprising the steps of:
(a) compressing a first gray level image that corresponds to a first color plane, utilizing an intra-color prediction;
(b) for the second gray level image relative to said first gray level image, performing repeatedly;
(i) calculating a predicted value of a pixel on the basis of inter-color correlations between at least one adjacent pixel in the second gray level image and at least one adjacent element in the first gray level image
(ii) comparing the predicted value and the real value of the element so as to produce residual value;
(iii) determining the context of said element;
(iv) quantizing said context;
(v) updating a quantized context related bias residue;
(vi) comparing the residual value and the bias residual value to produce a bias-free residual value; and
(vii) coding said bias-free residual value;
(c) for the third gray level image, performing said steps b(i) to b(vii) relative to either or both of said first gray level image and second gray level image;
the method wherein step b(i) includes:
(A) providing an inter-color neighborhood composed of inter-color elements; each element is produced by computing the difference value between the value of an adjacent pixel in said first gray level image and the value of corresponding adjacent pixel in said second gray level image;
(B) predicting the value of a pixel by calculating a linear combination of said elements and the value of the corresponding pixel in said first gray level image.

21. The method according to claim 20, wherein the predicted value of a pixel in the second gray level image is determined in either vertical or horizontal directions, or both vertical and horizontal directions taken as a weighted function, in accordance with the following algorithmic expressions:

$$\hat{Y}_{i,j}{}^v = D_{i-1,j} + X_{i,j} = Y_{i-1,j} + (X_{i,j} - X_{i-1,j}),$$

and $$\hat{Y}_{i,j}{}^h = D_{i,j-1} + X_{i,j} = Y_{i,j-1} + (X_{i,j} - X_{i,j-1}),$$

wherein said inter-color neighborhood stands for: $D_{i-1,j}$, $D_{i,j-1}$ and said $X_{i,j}$ stands for the corresponding pixel in said first gray level image.

22. A method for obtaining substantially lossless compression of a color digitized image that is composed of three distinct gray level images, which correspond to respective distinct color planes; each of said gray level images includes pixels, the method comprising the steps of:

(a) compressing a first gray level image that corresponds to a first color plane, utilizing an intra-color prediction;

(b) for the second gray level image relative to said first gray level image, performing repeatedly:
  (i) calculating a predicted value of a pixel on the basis of inter-color correlations between at least one adjacent pixel in the second gray level image and at least one adjacent element in the first gray level image;
  (ii) comparing the predicted value and the real value of the element so as to produce residual value;
  (iii) determining the context of said element;
  (iv) quantizing said context;
  (v) updating a quantized context related bias residue;
  (vi) comparing the residual value and the bias residual value to produce a bias-free residual value; and
  (vii) coding said bias-free residual value;

(c) for the third gray level image, performing said steps b(i) to b(vii) relative to either or both of said first gray level image and second gray level image, wherein step b(iii) of determining the context of said element including determining at least one context for the element values from the minimum of at least two pixel values in different color planes, each multiplied by a different component-dependent factor.

23. A method for obtaining substantially lossless compression of a color digitized image that is composed of three distinct gray level images, which correspond to respective distinct color planes; each of said gray level images includes pixels, the method comprising the steps of:

(a) compressing a first gray level image that corresponds to a first color plane, utilizing an intra-color prediction;

(b) for the second gray level image relative to said first gray level image, performing repeatedly:
  (i) calculating a predicted value of a pixel on the basis of inter-color correlations between at least one adjacent pixel in the second gray level image and at least one adjacent element in the first gray level image;
  (ii) comparing the predicted value and the real value of the element so as to produce residual value;
  (iii) determining the context of said element;
  (iv) quantizing said context;
  (v) updating a quantized context related bias residue;
  (vi) comparing the residual value and the bias residual value to produce a bias-free residual value; and
  (vii) coding said bias-free residual value;

(c) for the third gray level image, performing said steps b(i) to b(vii) relative to either or both of said first gray level image and second gray level image, wherein said prediction step on the basis of inter-color correlation stipulated in said step b(i) includes predicting the value of said element by calculating a non-linear combination of said inter-color elements and the value of the corresponding pixel in said first gray level image;

wherein the predicted value of a pixel in the second gray level image is determined in either vertical or horizontal directions, or both vertical and horizontal directions taken as a weighted function; the predicted value of a pixel are calculated in accordance with the following algorithmic expressions:

$$\hat{Y}_{i,j}^v = (Y_{i-1,j})^t \cdot \left(\frac{X_{i,j}}{1+X_{i-1,j}}\right)^p \text{ and}$$

$$\hat{Y}_{i,j}^h = (Y_{i,j-1})^u \cdot \left(\frac{X_{i,j}}{1+X_{i,j-1}}\right)^s,$$

wherein the exponents p, t, s, and u, take the values from the set of real numbers, $Y_{i-1,j}$ is one of the pixel in the neighborhood to the left the pixel $Y_{ij}$, $Y_{i-1,j}$ is one of the pixels in the neighborhood above the pixel $Y_{ij}$, the elements $X_{ij}$, $X_{i-1,j}$ and $X_{i,j-1}$ are the corresponding pixels in the first gray level image.

24. The method of claim 23, wherein the exponents t, p, s, and u are equal to 1.

25. A method for obtaining substantially lossless compression of a color digitized image that is composed of three distinct gray level images, which correspond to respective distinct color planes; each of said gray level images includes pixels, the method comprising the steps of:

(a) compressing a first gray level image that corresponds to a first color plane, utilizing an intra-color prediction;

(b) for the second gray level image relative to said first gray level image, performing repeatedly:
  (i) calculating a predicted value of a pixel on the basis of inter-color correlations between at least one adjacent pixel in the second gray level image and at least one adjacent element in the first gray level image;
  (ii) comparing the predicted value and the real value of the element so as to produce residual value;
  (iii) determining the context of said element;
  (iv) quantizing said context;
  (v) updating a quantized context related bias residue;
  (vi) comparing the residual value and the bias residual value to produce a bias-free residual value; and
  (vii) coding said bias-free residual value;

(c) for the third gray level image, performing said steps b(i) to b(vii) relative to either or both of said first gray level image and second gray level image, the method further comprising additional distinct gray level image, constituting fourth gray level image that correspond to fourth distinct color plain;

said method further comprising the step of:

for the fourth gray level image, performing said steps b(i) to b(vii) relative to either one or more than said first gray level image, said second gray level image or said third gray level image, wherein said steps include:

(A) initializing 256 contexts for use in the black prediction, where each context contains a single predictor value k (context), an averaged prediction residual and a number of the prediction residuals;

(B) for k component of each pixel (c, m, y, k) performing repeatedly,
  (i) computing the intra-plane predictor for k by using the intra-plane gradient context method (LOCO);
  (ii) computing the minimum integral value $CMY_{min}$ normalized to the largest value of $F_c c$, $F_m m$, and $F_y y$, where $F_c$, $F_m$, and $F_y$ are numbers between 0 and 1, normalizing $CMY_{min}$ to the largest value of $F_c c$, $F_m m$, and $F_y y$, and multiplying, by 255, to obtain an integral black prediction context between 0 and 255;
  (iii) using the predictor value, k (i.e., $f(CMY_{min})$, if a predictor value exists in the black prediction context $CMY_{min}$), and updating the averaged prediction residual and the number of the prediction residuals for every context;

(iv) storing the actual value of k as the predictor k (f(CMY$_{min}$)) for this context if no predictor value exists in the CMY$_{min}$ context;

(v) selecting a predictor according to the better of the two context-based average prediction residuals and encode the associated residual;

(C) adding a list consisting of the 256 predictor values contained in the 256 black prediction contexts into the compressed data stream for use by the decompression procedure.

26. The method of claim 25, wherein the four distinct color planes being Cyan, Magenta, Yellow and Black (CMYK).

27. The method of claim 26, wherein said first, second, third and fourth color planes correspond to Cyan Magenta, Yellow and Black (CMYK) colors, respectively.

28. The method of claim 25, wherein $F_c$, $F_m$, and $F_y$ are numbers 0.96, 1 and 0.27, respectively.

29. A method of decompression of a color image composed of three distinct color planes using a decoder, the method comprising:

(i) retrieving the compressed color image; and (ii) decoding at least one color pixel from data of compressed image, comprising the steps of:

(a) determining the context of at least one pixel by performing the steps that include:

(1) providing intra-color and inter-color neighborhoods constructed on the basis of the intra-color and inter-color correlations, wherein the intra-color and inter-color neighborhoods are composed of intra-color pixels and inter-color elements; and (2) determining the context of said pixel and element based on values of at least one gradient between at least two pixels and at least one gradient between at least two elements in said neighborhoods;

(b) calculating predicted values of a pixel and element on the basis of inter-color correlation between at least two adjacent pixels and between at least two adjacent elements, wherein the adjacent pixel is at least one pixel of the intra-color consolation and the adjacent element is at least one element in the second gray level image and corresponding at least one adjacent element in the first gray level image;

(c) accessing a context-specific code table and retrieving residual values from the table in response to encoded data, said residual vanities corresponding to intra- and inter-plane contexts;

(d) combining the residual values with the predicted values for at least one pixel and at least one element in order to obtain an actual value of said color pixel, wherein the predicted value of a pixel in the second gray level image is determined in either vertical or horizontal directions, or both vertical and horizontal directions taken as a weighted function, in accordance with the following algorithmic expressions:

$$\hat{Y}^v_{i,j} = D_{i-1,j} + X_{i,j} = Y_{i-1,j} + (X_{i,j} - X_{i-1,j}),$$

and $$\hat{Y}^h_{i,j} = D_{i,j-1} + X_{i,j} = Y_{i,j-1} + (X_{i,j} - X_{i,j-1}),$$

wherein said inter-color neighborhood stands for: $D_{i-1, j}$, $D_{i,j-1}$ and said $X_{ij}$ stands for the corresponding pixel in said first gray level image.

30. A method of decompression of a color image composed of three distinct color planes using a decoder, the method comprising:

(i) retrieving the compressed color image; and (ii) decoding at least one color pixel from data of compressed image, comprising the steps of:

(a) determining the context of at least one pixel by performing the steps that include:

(1) providing intra-color and inter-color neighborhoods constructed on the basis of the intra-color and inter-color correlations, wherein the intra-color and inter-color neighborhoods are composed of intra-color pixels and inter-color elements; and (2) determining the context of said pixel and element based on values of at least one gradient between at least two pixels and at least one gradient between at least two elements in said neighborhoods;

(b) calculating predicted values of a pixel and element on the basis of inter-color correlation between at least two adjacent pixels and between at least two adjacent elements, wherein the adjacent pixel is at least one pixel of the intra-color conelation and the adjacent element is at least one element in the second gray level image and corresponding at least one adjacent element in the first gray level image (c) accessing a context-specific code table and retrieving residual values from the table in response to encoded data, said residual values corresponding to intra- and inter-plane contexts;

(d) combining the residual values with the predicted values for at least one pixel and at least one element in order to obtain an actual value of said color pixel, wherein the predicted value of a pixel in the second gray level image is determined in either vertical or horizontal directions, or both vertical and horizontal directions taken as a weighted function, the predicted value of a pixel are calculated in accordance with the following algorithmic expressions:

$$\hat{Y}^v_{i,j} = (Y_{i-1,j})^t \cdot \left(\frac{X_{i,j}}{1 + X_{i-1,j}}\right)^p$$

and $$\hat{Y}^h_{i,j} = (Y_{i,j-1})^u \cdot \left(\frac{X_{i,j}}{1 + X_{i,j-1}}\right)^s,$$

wherein the exponents p, i, s, and u, take the values from the set of real numbers, $Y_{i-1j}$ is one of the pixel in the neighborhood to the left the pixel $Y_{ij}$, $Y_{1-1,j}$ is one of the pixels in the neighborhood above the pixel $Y_{ij}$, the elements $X_{ij}$, $X_{i-1j}$ and $X_{ij-1}$ are the corresponding pixels in the first gray level image.

31. The method of claim 30 wherein the exponents t, p, s, and u are equal to 1.

* * * * *

UNITED STATES PATENT AND TRADEMARK OFFICE
CERTIFICATE OF CORRECTION

PATENT NO. : 6,785,425 B1
DATED : August 31, 2004
INVENTOR(S) : Feder et al.

It is certified that error appears in the above-identified patent and that said Letters Patent is hereby corrected as shown below:

Column 22,
Line 13, change "$Y_{ij}$" to -- $Y_{i,j}$ --;

Column 23,
Line 40, delete "consolation" and insert -- correlation --;
Line 46, delete "vanities" and insert -- values --;

Column 24,
Line 2, change "$X_{ij}$" to -- $X_{i,j}$ --;
Line 27, delete "conelation" and insert -- correlation --;
Line 55, change "$Y_{i-1,j}$" to -- $X_{i-1,j}$ --;
Line 56, change "$Y_{ij,\, Y_{1-1,j}}$" to -- $Y_{i,j},\, Y_{i-1,j}$ --;
Line 57, change "$Y_{ij}$" to -- $X_{i,j}$ --;
Line 57, change "$X_{ij},\, X_{i-1j}$" to -- $X_{i,j},\, X_{i-1,j}$ --;
Line 58, change "$X_{ij}$" to -- $X_{i,j}$ --.

Signed and Sealed this

Twenty-eighth Day of June, 2005

JON W. DUDAS
*Director of the United States Patent and Trademark Office*